(12) United States Patent
Dale et al.

(10) Patent No.: US 8,099,822 B2
(45) Date of Patent: Jan. 24, 2012

(54) GRILL OILER

(76) Inventors: Douglas Dale, Tahoe City, CA (US);
Theodore McBain, Reno, NV (US)

( * ) Notice: Subject to any disclaimer, the term of this patent is extended or adjusted under 35 U.S.C. 154(b) by 974 days.

(21) Appl. No.: 11/932,952

(22) Filed: Oct. 31, 2007

(65) Prior Publication Data

US 2008/0052853 A1    Mar. 6, 2008

Related U.S. Application Data

(63) Continuation-in-part of application No. 10/895,264, filed on Jul. 19, 2004, now abandoned.

(51) Int. Cl.
*A47L 13/16* (2006.01)
*A47L 13/30* (2006.01)

(52) U.S. Cl. ........... 15/231; 15/145; 15/210.1; 401/261; 401/290

(58) Field of Classification Search ............ 15/228, 15/231, 147.1, 145, 210.1, 104.94; 401/202, 401/205, 206, 261, 290
See application file for complete search history.

(56) References Cited

U.S. PATENT DOCUMENTS

| | | | |
|---|---|---|---|
| 1,070,598 A | | 8/1913 | Guggenheim |
| 1,534,259 A | | 4/1925 | Dempsey |
| 1,699,840 A | * | 1/1929 | Goldblatt ............... 15/235.4 |
| 2,205,535 A | * | 6/1940 | Muckenhirn ............... 15/145 |
| 2,739,334 A | * | 3/1956 | Hardey ............... 15/231 |
| 2,994,901 A | | 5/1958 | Ely et al. |
| 2,990,564 A | | 7/1961 | Sweeney et al. |
| 5,058,231 A | * | 10/1991 | Lowe ............... 15/182 |
| 5,461,749 A | * | 10/1995 | Ahlberg et al. ............... 15/231 |
| 5,945,076 A | | 8/1999 | Leonard et al. |
| 6,134,738 A | | 10/2000 | Weber et al. |
| 6,443,646 B1 | | 9/2002 | MacDonald |
| 2006/0029457 A1 | | 2/2006 | Dale et al. |

FOREIGN PATENT DOCUMENTS

WO    2006020181 A2    2/2006

OTHER PUBLICATIONS

International Search Report and Written Opinion in corresponding International Patent Application No. PCT/US05/25372 filed Jul. 18, 2005.

* cited by examiner

*Primary Examiner* — Gary Graham

(74) *Attorney, Agent, or Firm* — Lewis and Roca LLP

(57) ABSTRACT

A grill oiler for applying oil to a grill comprising a handle attached to an applicator body. An applicator sleeve envelopes an applicator surface. The applicator surface is releasably attached to the applicator body such that the applicator sleeve may be easily replaced when worn or excessively soiled.

4 Claims, 13 Drawing Sheets

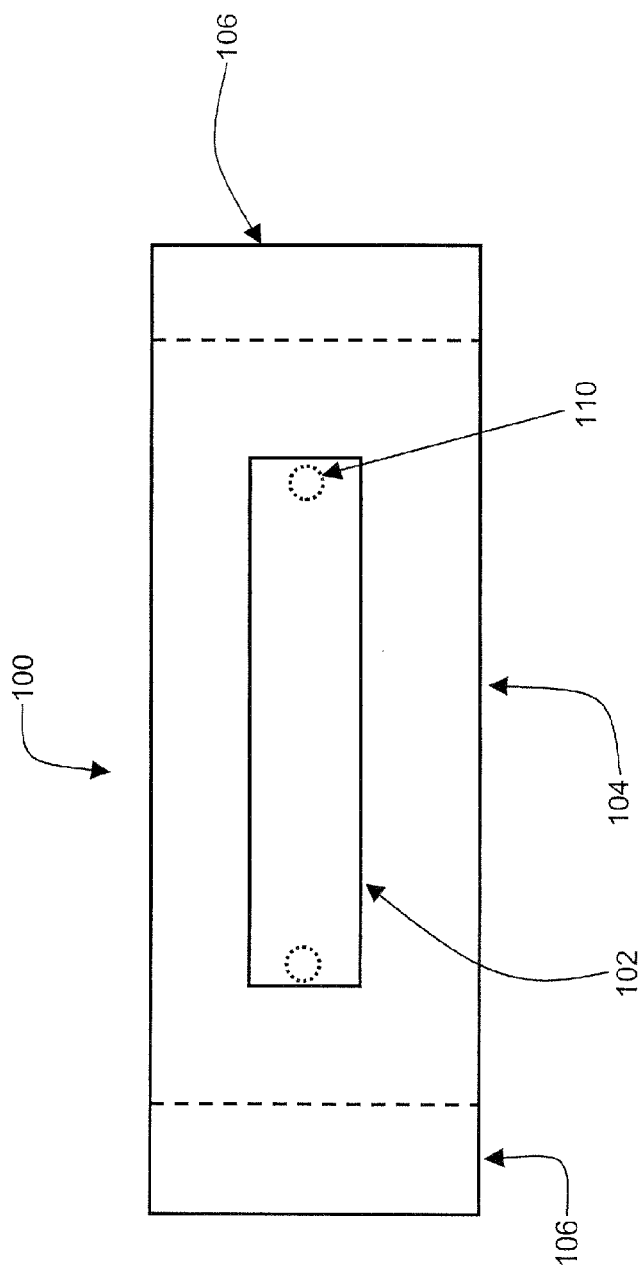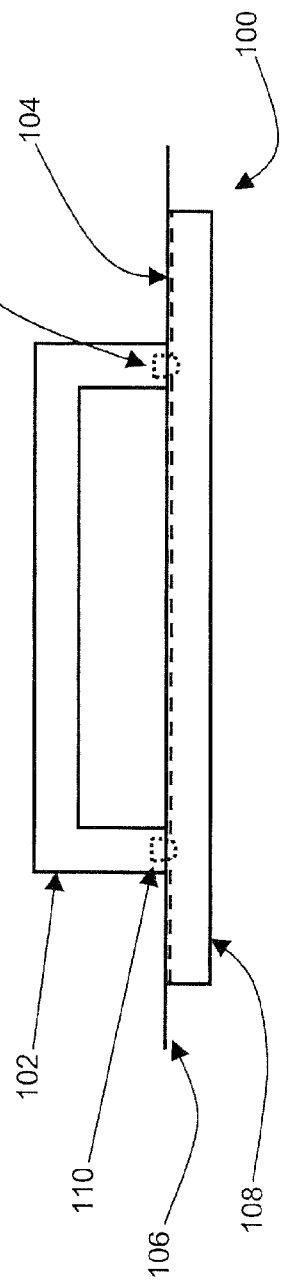
FIG. 1A
FIG. 1B

FIG. 3A
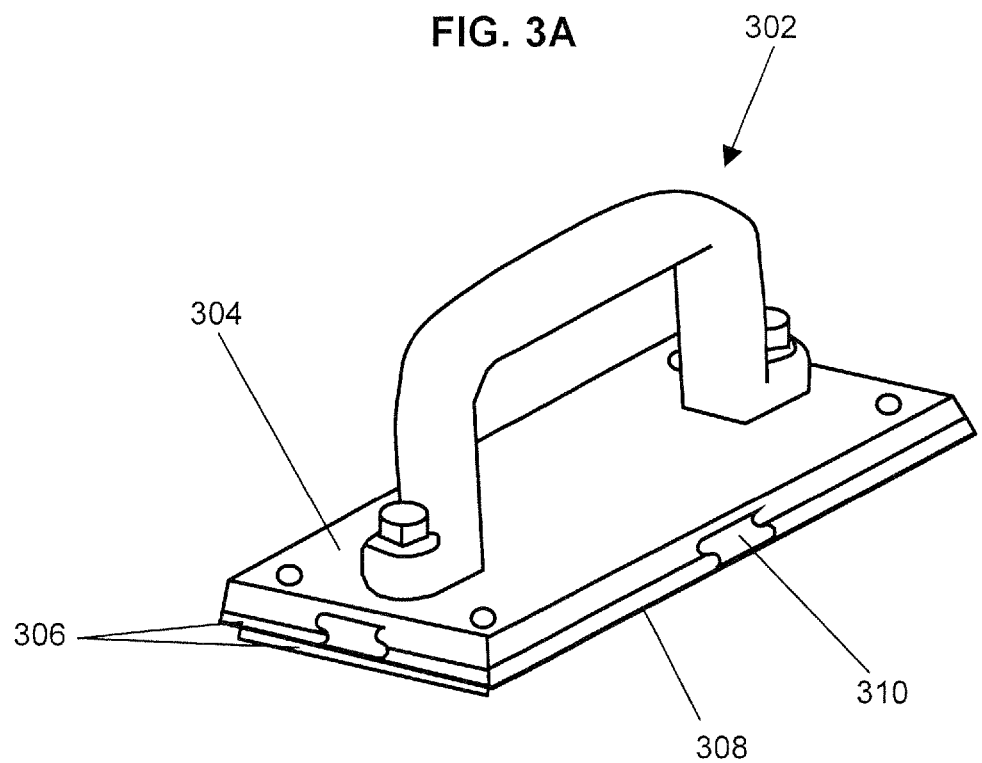
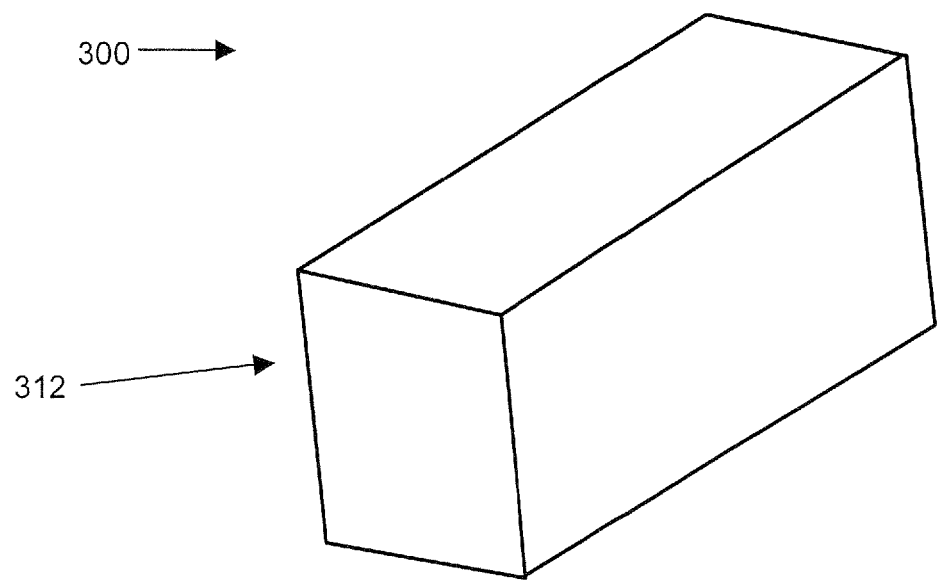

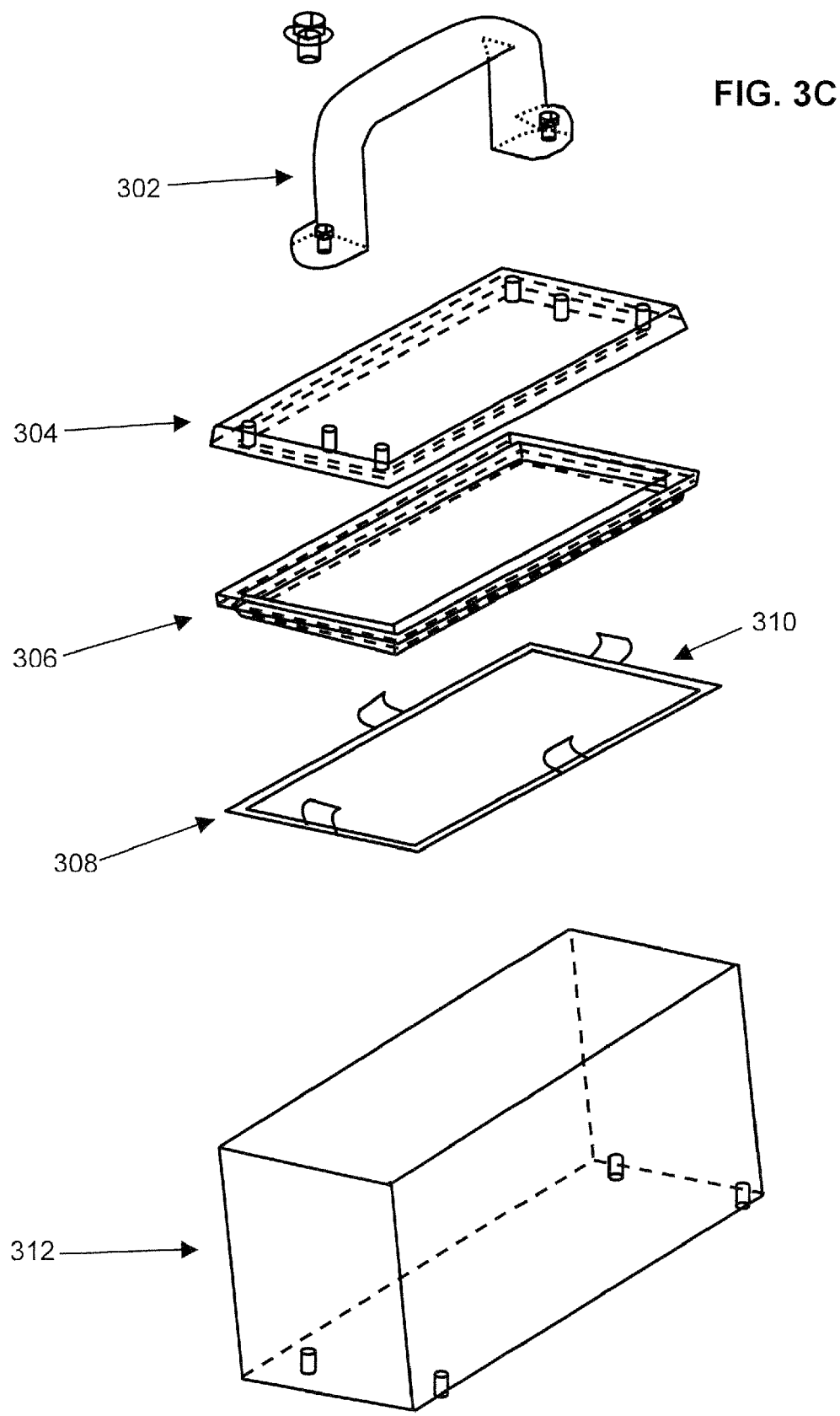

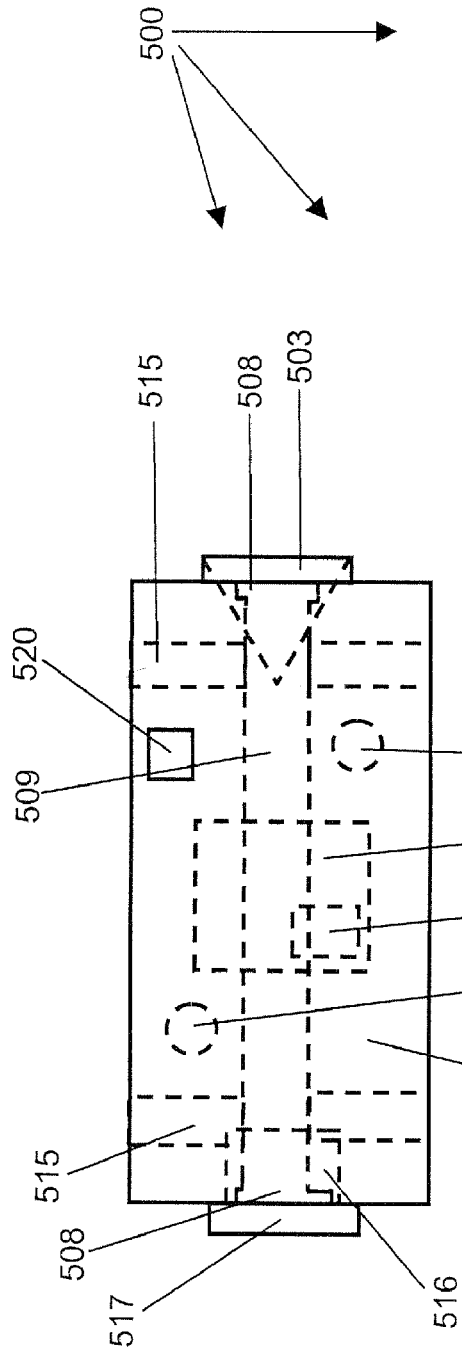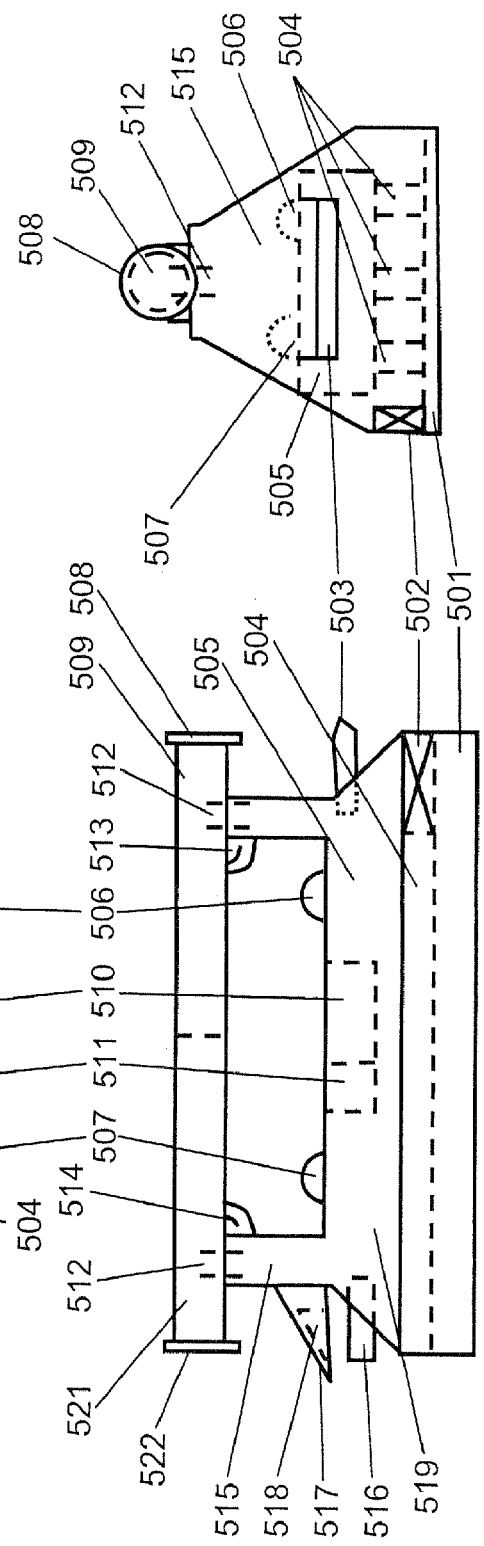

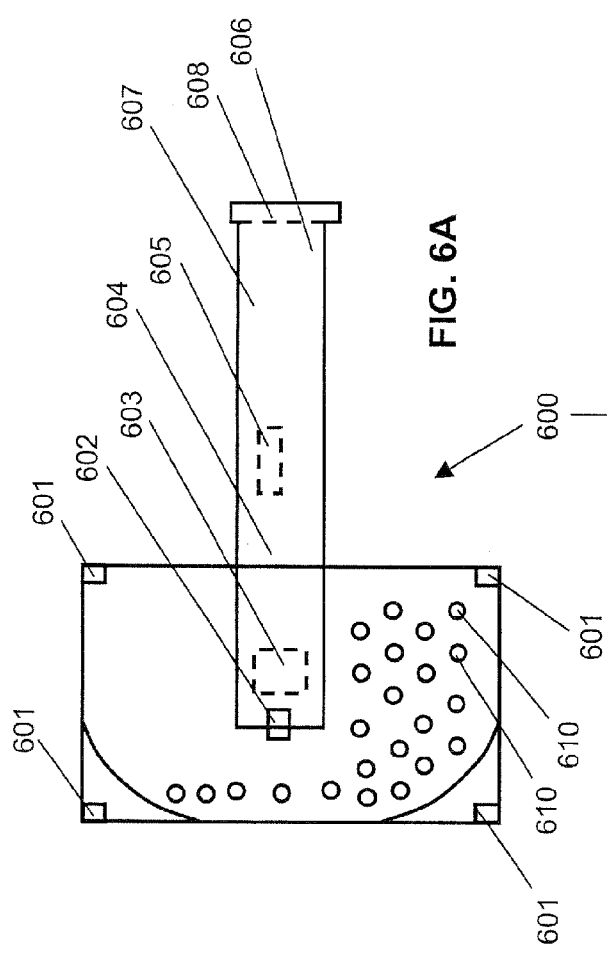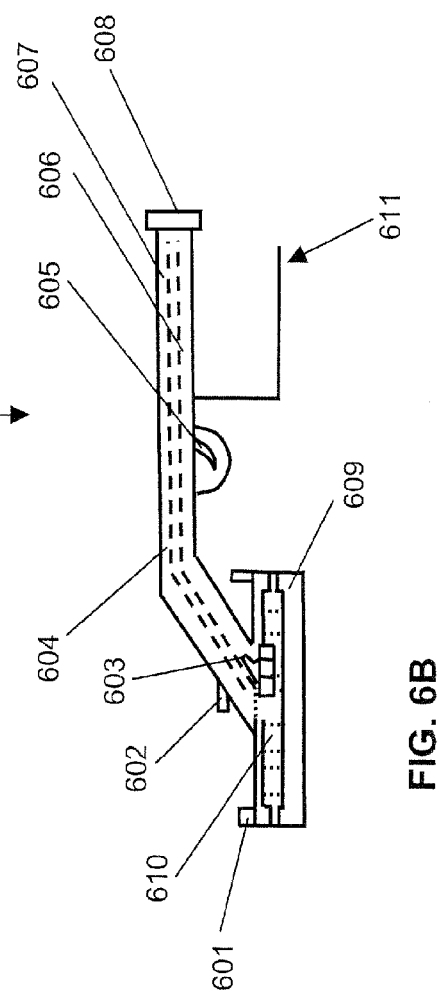
FIG. 6A
FIG. 6B

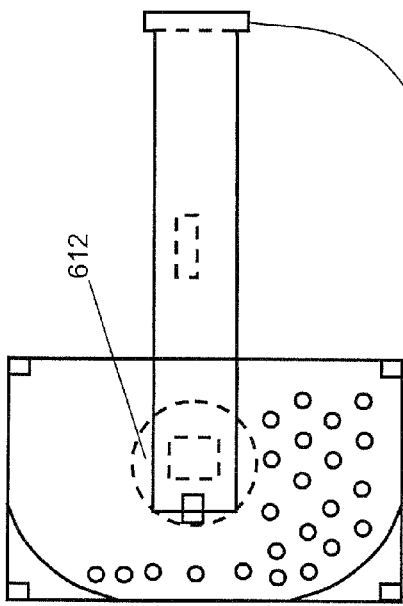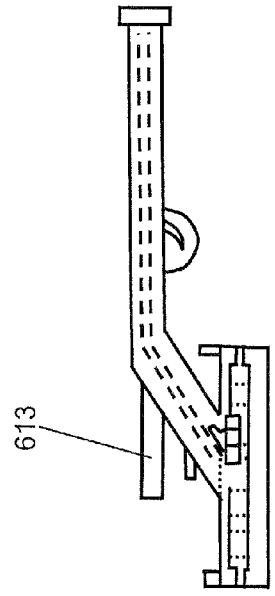

GRILL OILER

CROSS-REFERENCE TO RELATED APPLICATION

This application is a continuation-in-part of co-pending U.S. patent application Ser. No. 10/895,264, filed Jul. 19, 2004, which is hereby incorporated by reference as if set forth herein.

BACKGROUND OF THE INVENTION

1. Field of the Invention

The present invention relates to a grill oiler for applying oil to a grill and more particularly pertains to a new grill oiler for cleaning and dressing a grill surface by facilitating oil application to the grill surface.

2. Background of the Related Art

A grill oiler is a device that is used to clean and dress a flat heated plate such as a cooking grill or other cooking surfaces such as a grated surface of a barbeque. Cooking grills are typically kept in a heated state and used for long periods of time to cook and prepare various types of food items. Some food items may include hamburger patties, hot-dogs, rolls, onions and other eatable items. As a result, frequent cleaning of the grill surface is necessary to maintain sanitary cooking conditions and produce tasteful food products that are untainted with the flavors of a previously prepared food item.

The continuous heating of the grill surface combined with the physical contact with the various food items results in the formation of heated and/or charred food particles adhering to the grill surface. The removal of these adhered food particles can be a difficult and laborious task that usually requires brushing, scraping and scouring combined with the application of a suitable detergent, solution or solvent.

The use of various brushes and scouring pads (i.e., steel wool) are well known in the art and generally consist of brushes and pads with familiar and obvious structural configurations. While these devices are somewhat useful and provide some limited benefits to the art, they are deficient in several respects. First, a typical brush cleaner when used vigorously to clean a grill will cause particles to dislodge and splatter due to the flicking and deflection action of the bristles. This makes the cleaning of the grill surface a messy and potentially germ spreading procedure. Second, known devices typically do not easily facilitate the application of a cleaning solution or solvent. Devices configured with known reservoirs incorporated into the device typically do not provide for adequate dispersion of the solution or solvent and may also dispense excessive fluid. Finally, in devices that incorporate the use of a material designed to abrade or wear (i.e., steel wool, brillo pads and the like), they frequently may leave unwanted material particles or residue on the grill surface. As a result, the material particles are then capable of contaminating the next food item prepared on the grill surface.

Accordingly, there is a long felt need in the art for a grill oiler that provides for easily cleaning and dressing of a grill surface and is devoid of the above noted deficiencies.

SUMMARY OF THE INVENTION

This patent discloses and claims a useful, novel, and unobvious invention for a grill oiler. The present invention is a method and apparatus that facilitates the cleaning and dressing of a grill or cooking surface.

In one exemplary embodiment, the invention provides a grill oiler for applying oil to a cooking surface. The grill oiler comprises a handle having a first end, a second end and a central grasping portion. An applicator body having a first end, a second end, a first side, an opposing second side, a top and a bottom. The handle is coupled to the top of the applicator body such that the first end of the handle is adjacent to the first end of the applicator body and the second end of the handle is adjacent to the second end of the applicator body. The grill oiler includes an applicator surface member having a first end, a second end, a first side, an opposing second side, an inner bottom surface and an exterior bottom surface. The applicator surface member is configured to receive a portion of the applicator body therein. There is a pivot means configured to couple the second end of the applicator body with the second end of the applicator surface member. A latch mechanism is configured to releasably couple the first end of the applicator body with the first end of the applicator surface member. The grill oiler also has an applicator sleeve coupled with the applicator surface member.

In other variations, the grill oiler comprises different pivot means configurations. In one embodiment, the pivot means is a set of interlocking cusps. In another embodiment, the pivot means utilizes a tab and slot configuration. Another variation has a hinge as the pivot means.

Other variations of the grill oiler has various latching mechanisms. In one example, the latch mechanism comprises a spring-loaded latch member coupled with the first end of the applicator body. The latch member is configured to engage a receiving aperture formed on the first end of the application surface member. Another variation has a rotational latch member coupled to the first end of the applicator body. The latch member is configured to engage a securing pin formed on the first end of the application surface member. In still another variation, the grill oiler has a latch mechanism comprises at least one magnet that couples the first end of the applicator body with the first end of the applicator surface member.

The invention provides another embodiment having an applicator sleeve that is fabricated with a retention tab. The retention tab is captured between the second end of the applicator body and the second end of the applicator surface member. In one variation, the retention tab may be capture within the pivot means.

Another exemplary embodiment for the present invention, provides a grill oiler for applying oil to a cooking surface comprising a handle having a first end, a second end and a central grasping portion. An applicator body having a first end, a second end, a first side, an opposing second side, a top and a bottom. The handle is coupled to the top of the applicator body such that the first end of the handle is adjacent to the first end of the applicator body and the second end of the handle is adjacent to the second end of the applicator body. The grill oiler has at least one locking mechanism coupled with a side of the applicator body and adjacent to an end of the applicator body.

The grill oiler also has an applicator surface member having a first end, a second end, a first side, an opposing second side, an inner bottom surface and an exterior bottom surface, the applicator surface member configured to receive a portion of the applicator body therein. There is at least one receiving aperture formed in a side of the applicator surface member and adjacent to an end of the applicator surface member, such that the aperture and the locking mechanism are aligned when the applicator body is inserted into the applicator surface member. The grill oiler has an applicator sleeve coupled with the applicator surface member.

In one variation, the grill oiler has a locking mechanism that comprises a spring-loaded locking member that may be sealed with an O-ring. In an alternate construction, the locking mechanism may comprise at least one magnet that couples the applicator body with the applicator surface member.

For a fuller understanding of the nature and advantages of the present invention, reference should be made to the ensuing detailed description and claims, taken in conjunction with the accompanying drawings.

BRIEF DESCRIPTION OF THE DRAWINGS

FIG. 1A is a perspective view of one embodiment of the grill oiler;

FIG. 1B is a side view of the grill oiler of FIG. 1A;

FIG. 3A is another embodiment of a grill oiler with an oil reservoir container;

FIG. 3C is a view of the separated individual components of the grill oiler of FIG. 3A;

FIG. 5A is a perspective view of another embodiment of the grill oiler;

FIG. 5B is a side view of the grill oiler of FIG. 5A;

FIG. 5C is another side view of the grill oiler of FIG. 5A;

FIG. 6A is a perspective view of another embodiment of the grill oiler;

FIG. 6B is a side view of the grill oiler of FIG. 6A;

FIG. 6C is a perspective view of an alternative embodiment of the grill oiler;

FIG. 6D is a side view of an alternative embodiment of the grill oiler;

DETAILED DESCRIPTION OF THE INVENTION

Figure 2:
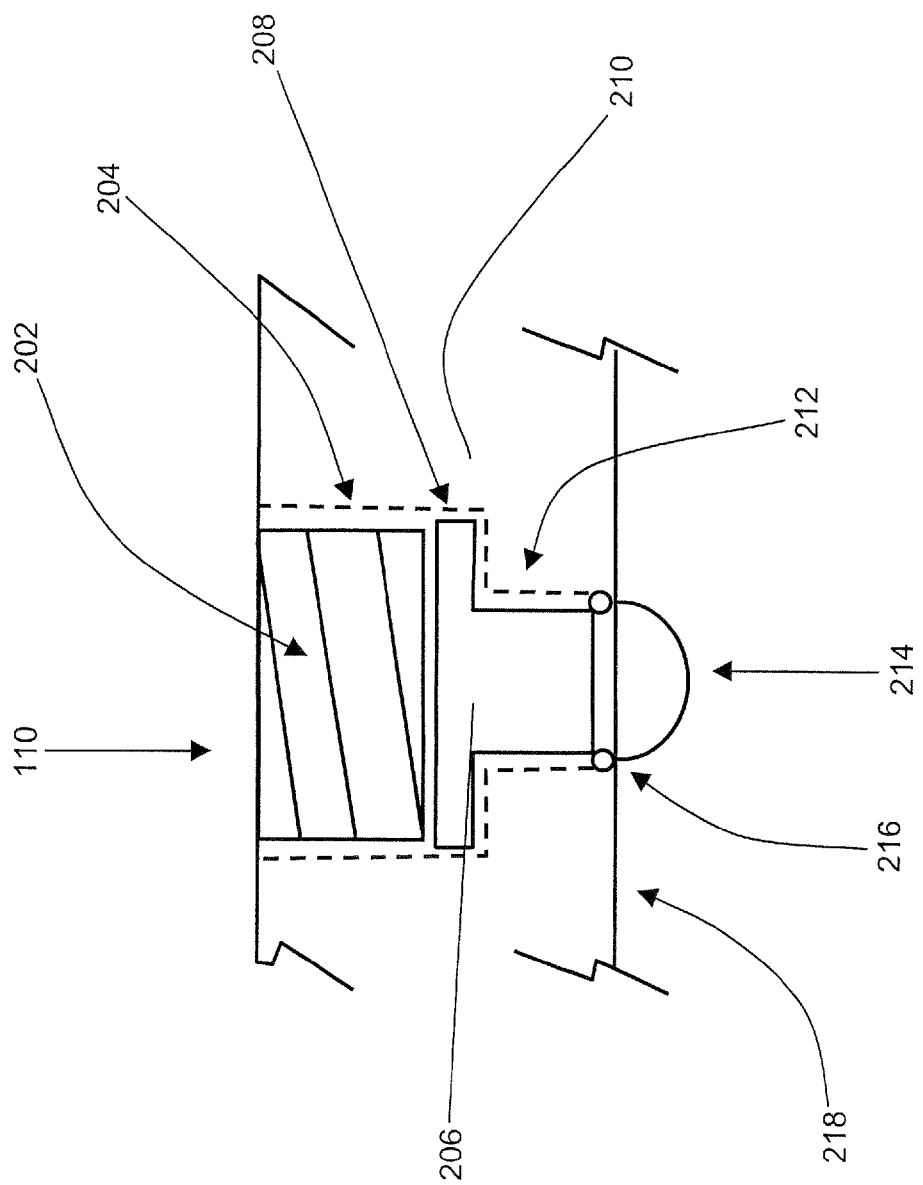
FIG. 2 is a side view of an exemplary embodiment of an applicator locking bullet.

The following description of the present invention is not intended to limit the scope of the invention to these preferred embodiments, but rather to enable any person skilled in the art to make and use the invention.

FIG. 1A and FIG. 1B disclose a grill oiler 100 for applying oil to a grill. Grill oiler 100 comprises a handle 102 attached to an applicator body 104. The handle 102 and applicator body 104 are releasably attached to applicator surface 108. In the present embodiment, the handle 102 and applicator body 104 may be releasably attached to applicator surface 108 through the use of a variety of attaching means such as applicator locking bullets 110. Other means that may be used to releasably attach handle 102 and applicator body 104 to applicator surface 108, include but are not limited to retaining clips and opposing magnets. Applicator surface 108 can be placed in a source of oil and applied to a grill in order to apply oil to the grill. The applicator body 104 comprises spring flaps 106 for maintaining the applicator surface 108 out of the source of oil when no force is being applied to the handle 102 and applicator body 104.

FIG. 2 discloses an exemplary embodiment of applicator locking bullet 110. A handle and applicator body 210 comprises a spring chamber 204 containing a spring 202 above a bullet 206. Bullet 206 has a bullet shoulder 208 for keeping the bullet inside the handle and applicator body 210, a locking bullet tip 214 extending outside an O-ring cylinder 212 and below an applicator holder surface 218 when no external force is being applied to it, and an O-ring 216 for keeping oil outside of the O-ring cylinder 212 and spring chamber 204.

In order to attach the handle 102 and the applicator body 104 to the applicator surface 108, as in FIG. 1B, the applicator holder surface 218 may be placed on top of the applicator surface 108 by sliding the holder surface 218 across the top of the applicator surface 108 until they are properly aligned. As the holder surface 218 is pressed against the applicator surface 108, the applicator surface 108 presses against the bullet tip 214, moving it upward. As the bullet tip 214 moves upward through the O-ring cylinder 212, the O-ring 216 moves along with it, blocking any oil from entering the O-ring cylinder 212 and the spring chamber 204. The bullet 206 moves upward as well, pushing against the spring 202. Once the holder surface 218 is properly aligned with the applicator surface 108, the spring 202 is able to exert sufficient force upon the bullet 206 to cause the bullet tip 214 to move downward through the O-ring cylinder 212, outside of the holder surface 218, and lock into the applicator surface 108.

Figure 3B:
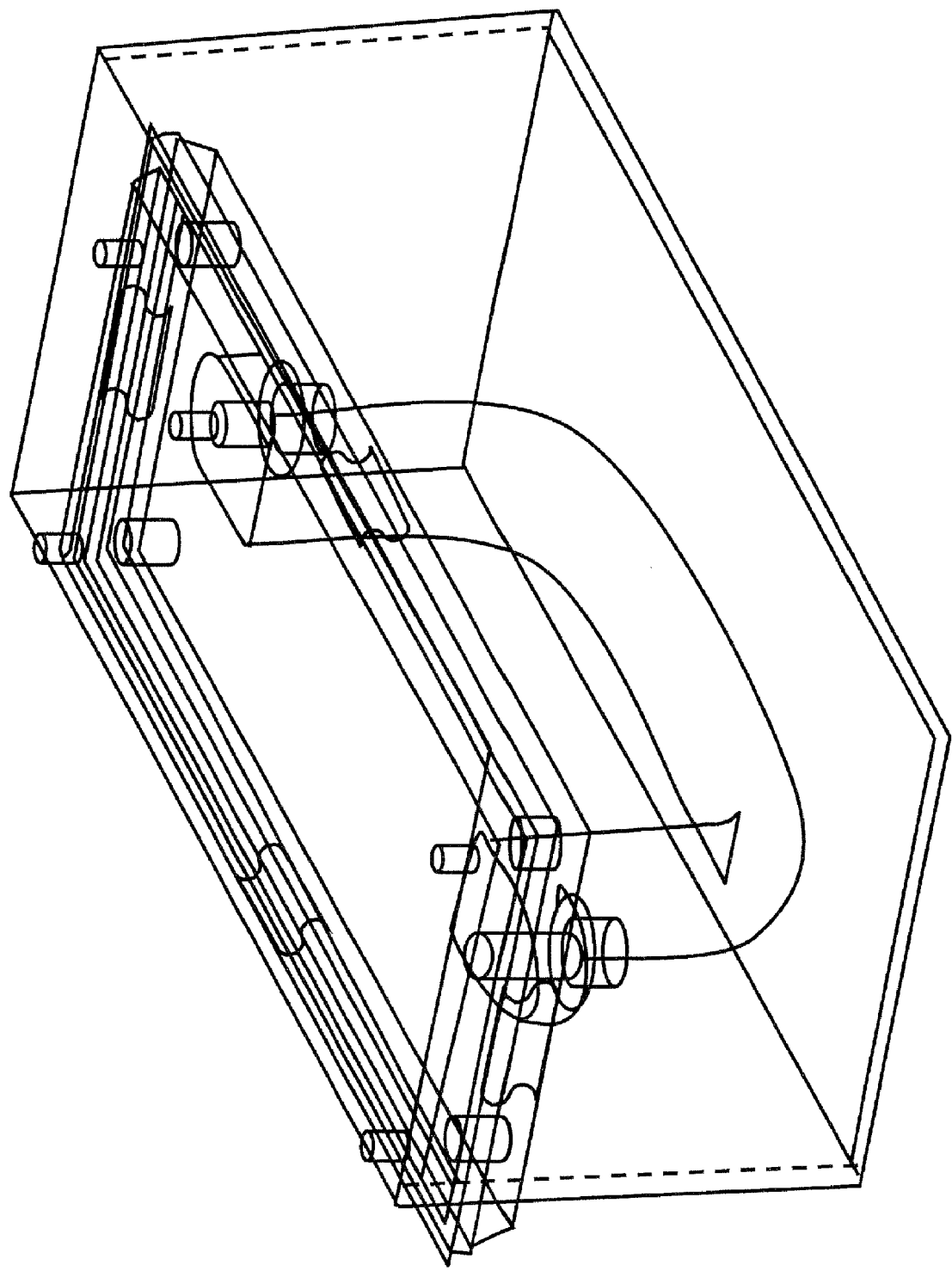
FIG. 3B is a view of the grill oiler of FIG. 3A inside the oil reservoir container.

FIGS. 3A-3C disclose another embodiment of a grill oiler 300. A handle 302 is attached to an applicator body 304. An applicator surface 306 may be attached to the applicator body 304 through the use of a variety of attaching means such as a retaining clip frame 308 with retaining clips 310. The retaining clip frame 308 supports applicator surface 306 against the applicator body 304 and is held in place by retaining clips 310 clipping onto the applicator body 304. Other means may be used to releasably attach handle 302 and applicator body 304 to applicator surface 306, including but not limited to locking bullet means and opposing magnets. Oil may be applied to the applicator surface 306 by placing the applicator surface 306 into an oil source such as an oil reservoir container 312 containing oil.

Figure 4:
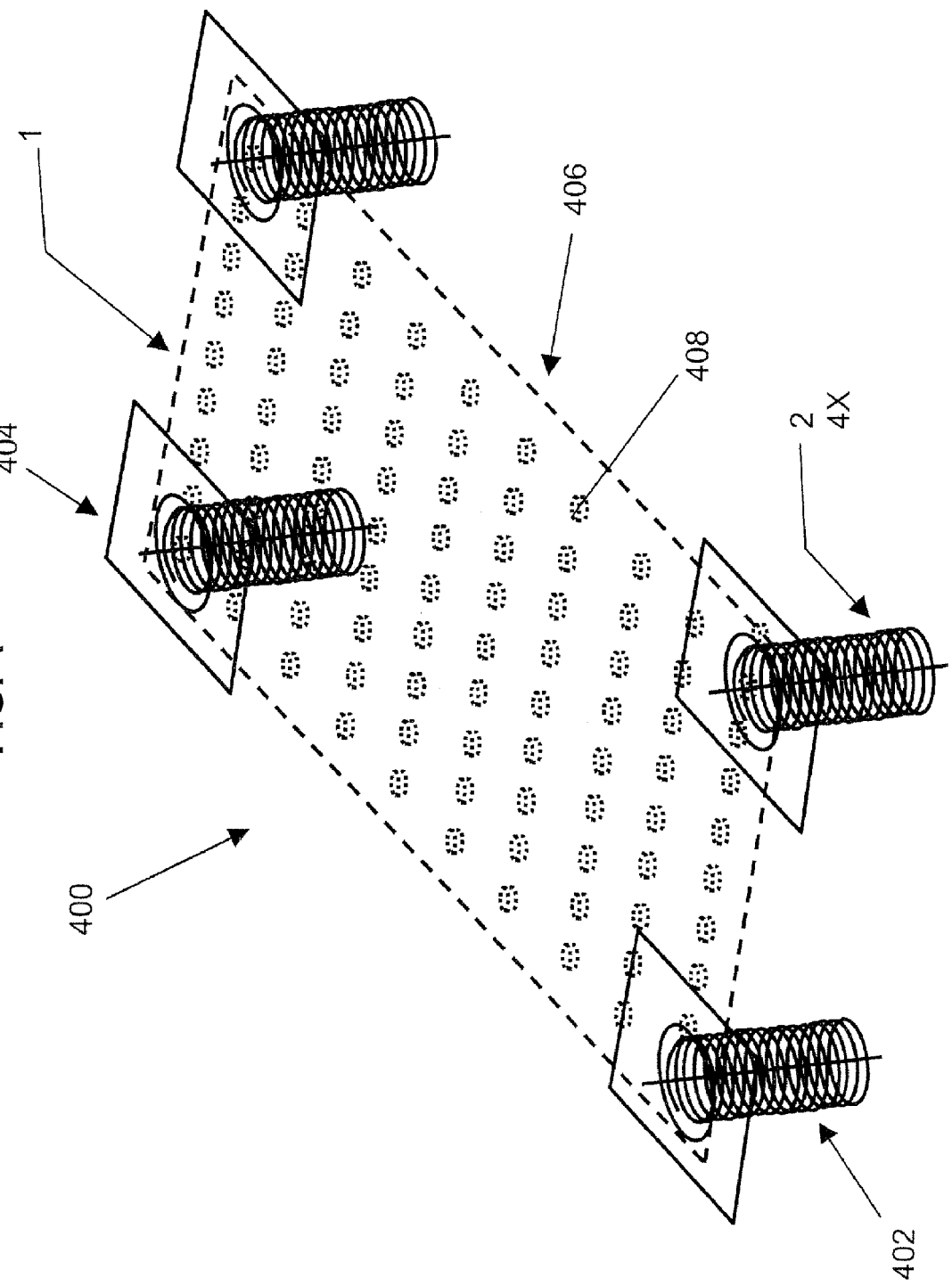
FIG. 4 is an exemplary embodiment of an oil reservoir spring system.

In an alternative embodiment of the present invention, FIG. 4 discloses an oil reservoir spring system 400 that can be used in the oil reservoir container 312 of FIGS. 3A-3C. The spring system comprises reservoir springs 402 located at the bottom of the oil reservoir container 312. The reservoir springs 402 are attached to the bottom of spring platforms 404. An applicator platform 406 having applicator platform apertures 408 is located on top of the spring platforms 404. When an applicator surface, such as applicator surface 306 in FIGS. 3A-3C, is placed inside the oil reservoir container 312 and on top of the spring system 400, the applicator surface 306 remains above any oil located at the bottom of the oil reservoir container 312 if no downward force is applied to the applicator surface 306. However, if enough downward force is applied to the applicator surface 306, the applicator surface may push against the applicator platform 406, which in turn pushes down on the spring platforms 404, causing the reservoir springs to compress. In this situation, the applicator platform 406 and the applicator surface 306 may be lowered into oil located at the bottom of the oil reservoir container 312, causing oil to be applied to the applicator surface 306 through the applicator platform apertures 408.

FIGS. 5A-5C disclose another embodiment of grill oiler 500. An applicator surface 501 is attached to the bottom of an oil manifold 504. The applicator surface 501 may be releasably attached to the oil manifold 504 by a variety of attaching means comprising, but not limited to, locking bullets, retaining clips, and opposing magnets. An oil applicator release switch 502 may be used to detach applicator surface 501 from the oil manifold 504. A liquid chamber 505 and an oil chamber 519 are connected to the top of the oil manifold 504.

The liquid chamber 505 may contain a liquid, such as water, that can be released out of a cooler water jet 503 connected to the liquid chamber 505. The liquid is placed in an upper water chamber 509 by removing a water reservoir cap 508 and pouring in the liquid. The liquid may then pass through an upper chamber down port 512, contained in a mid-chamber handle structure 515, into the liquid chamber 505 and eventually out of the cooler water jet 503. The release of the liquid from the cooler water jet 503 may be controlled by a water trigger 513. A liquid level indicator 506 indicates how much liquid is present in the liquid chamber 505.

The oil chamber 519 may contain oil that can be transferred through the oil manifold 504 to the applicator surface 501. The oil is placed in an upper oil chamber 521 by removing an oil reservoir cap 522 and pouring in the oil. The oil may then pass through an upper chamber down port 512, contained in a mid-chamber handle structure 515, into the oil chamber 519. The oil is eventually transferred through the oil manifold 504 to the applicator surface 501. The transfer of oil to the applicator surface 501 may be controlled by an oil release trigger 514. An oil level indicator 507 indicates how much liquid is present in the oil chamber 519.

The present invention may also comprise a light housing 517 containing a light source 518 for improving visibility. Furthermore, a heat sensor unit 516 may be attached to the grill oiler 500. The heat sensor unit 516 may be connected to a heat sensor chamber/display 511 and a temperature display 520 to indicate heat level. The grill oiler 500 may also comprise a battery compartment 510 connected to any part of the grill oiler 500 that may require a power source, such as the light housing 517, the light source 518, the heat sensor unit 516, the heat sensor chamber/display 511, and the temperature display 520.

FIGS. 6A-6D disclose an alternative embodiment of grill oiler 600. Referring to FIGS. 6A-6B, a handle 604 is attached to an oil applicator port 610. An applicator surface 609 may be releasably attached to the oil applicator port 610 by a variety of attaching means such as applicator retaining clips 601. Other means that may be used to releasably attach the applicator surface 609 to the oil applicator port 610, include but are not limited to locking bullet means and opposing magnets. The handle 604 comprises an oil chamber 606, water chamber 607, and an oil and water chamber cap 608 located at the end of the handle 604 and covering the oil chamber 606 and the water chamber 607.

Oil may be placed in the oil chamber 606 by removing the oil and water chamber cap 608 and pouring the oil into the oil chamber 606. A pressure release valve (oil regulator) 603 connects the oil chamber 606 and the oil applicator port 610. Oil may be transferred to the applicator surface 609 by using the handle 604 to press the applicator surface 609 against a surface, such as a grill, causing the oil regulator 603 to release oil from the oil chamber 606 into the oil applicator port 610. The oil is then transferred from the oil applicator port 610 to the applicator surface 609, and may then be applied to a grill.

Water may be placed in the water chamber 607 by removing the oil and water chamber cap 608 and pouring the water into the water chamber 607. A water trigger 605 may be used to regulate the flow of water from the water chamber 607 out through a cooler water jet 602 located on the grill oiler 600.

Additionally, a heat shield 611 may be placed on the handle 604 in order to provide protection from any heat present while using the grill oiler 600.

Referring to FIG. 6C, a swivel-locking handle with quick release 612 may be attached to the oil applicator port 610 in order to provide a greater range of motion. Referring to FIG. 6D, a light and battery chamber 613 may be used to provide greater visibility.

Figure 7A:
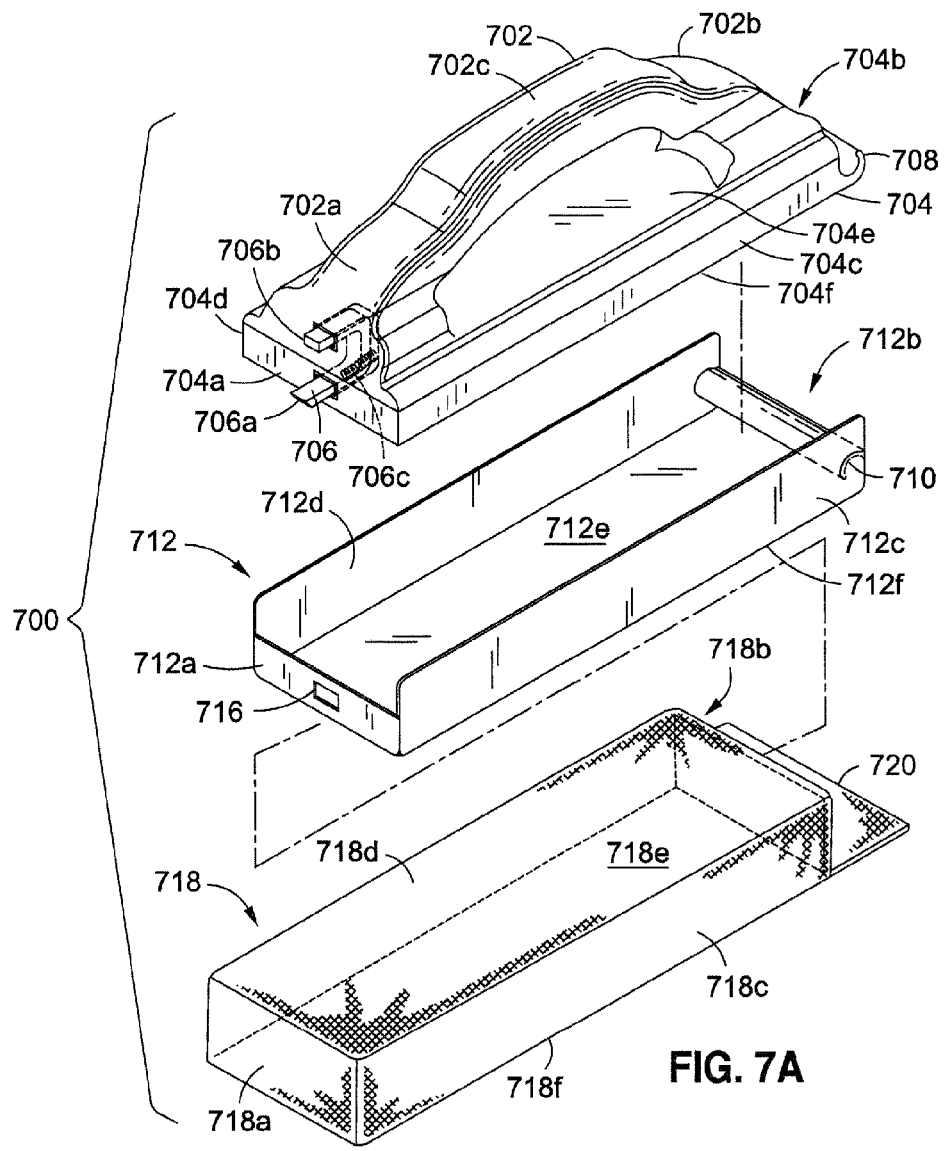
FIG. 7A is an exploded isometric view of an alternate embodiment of the grill oiler in accordance with the present invention.
Figure 7B:
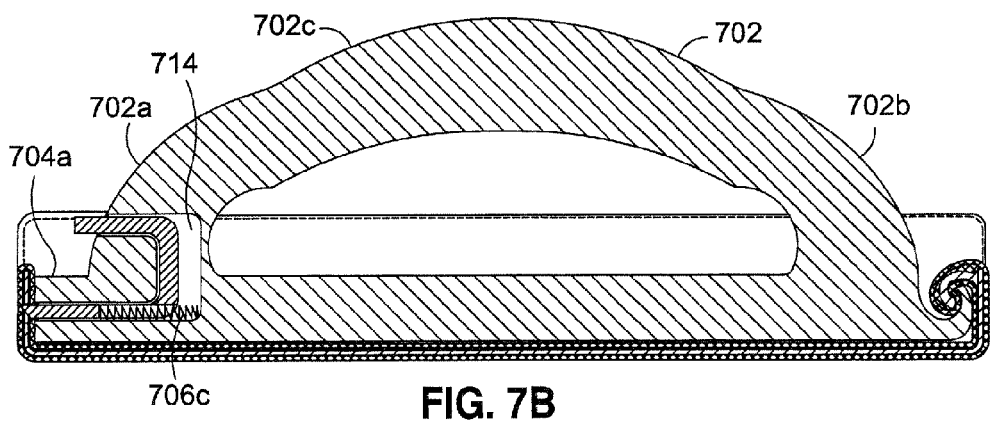
FIG. 7B is a cross-sectional view of the grill oiler assembly of FIG. 7A.

Another exemplary embodiment for a grill oiler 700 is shown in FIGS. 7A and 7B. The grill oiler 700 has a handle 702 that is attached or integrally formed with a top surface of an applicator body 704. The handle 702 has a first end 702*a* and a second end 702*b* forming a contoured grasping portion 702*c* there between. The applicator body 704 has a first end 704*a*, a second end 704*b*, a first side 704*c*, an opposing second side 704*d*, a top surface 704*e*, and an opposing bottom surface 704*f*. The handle 702 is associated with the applicator body such that the first end 702*a* of the handle 702 is adjacent to the first end 704*a* of the applicator body 704. Likewise, the second end 702*b* of the handle 702 is adjacent to the second end 704*b* of the applicator body. Assembled into and/or onto the first end 704*a* of the applicator body 704 is a latching mechanism 706. Formed with the second end 704*b* of the applicator body is an upward turned cusp 708 which is configured to engage, interlock and mate with a corresponding downward turned cusp 710 formed on an applicator surface member 712. The applicator surface member 712 is described in greater detail below.

The handle 702 and applicator body 704 may be fabricated as individual components or alternatively may be fabricated as a unitary construction. It is contemplated that the handle 702 and applicator body 704 may be fabricated from various materials such as metals, alloys, composites, polymers or combinations thereof. One of ordinary skill in the art would readily appreciate that various manufacturing processes, now known or later developed, may be implemented to produce the handle 702 and applicator body 704. For example, suitable manufacturing processes may include machining, injection molding, casting, vacuum forming or combinations thereof.

The first end 704*a* of the applicator body 704 has a latching mechanism 706 associated therewith. The latching mechanism 706 is contemplated to be a spring-loaded generally U-Shaped member having a latch end 706*a* and a release end 706*b*. The latch mechanism 706 is slidably positioned within a retention cavity 714 formed within the handle 702 and applicator body 704 assembly. The latch mechanism 706 is positionable between a first forward position and a second rearward position.

In the first forward position, the latch mechanism 706 is located such that the latch end 706*a* extends beyond the first end 704*a* of the applicator body 704. This enables the latch end 706*a* to operatively engage and extend into a corresponding receiving aperture 716 in the applicator surface member 712. The latch mechanism 706 is biased to a forward position by a spring 706c which is operatively configured to apply a force between the latch mechanism 706 and an inside surface of the retention cavity 714. The release end 706b of the latch mechanism 706 is positioned for convenient activation by a user grasping the handle 702 of the grill oiler 700. The release end 706b extends beyond an outer surface of the first end 702a of the handle 702 such that a user may apply a force to the release end 706b and thereby cause movement of the latch mechanism 706 from the first position to the second position. By depressing the release end 706b of the latch mechanism 706, the mechanism slides in the retention cavity 714 towards the second rearward position. The movement of the latch mechanism 706 in turn causes the latch end 706a to disengage or retract from the receiving aperture 716. Once disengaged, the applicator body 704 and applicator surface member 712 are free to pivot with respect to each other.

The second end 704b of the applicator body 704 has a releasable pivot provided by an upturned cusp 708 that extends there from and generally spans between the first side 704c to the second side 704d of the applicator body 704. However, it is contemplated that the upturned cusp 708 may extend or comprise a length that is proportional to the width of the applicator body 704, where the width is defined by the distance between the first and second sides 704c and 704d of the applicator body 704. The upward turned cusp 708 of the applicator body 704 pivotally and releasbly engages and interlocks with a mating cusp 710 of the applicator surface member 712. Accordingly, the handle 702 and applicator body 704 can pivot with respect to the applicator surface member 712. As illustrated in FIG. 7B, the inter locking cusps 708 and 710 form a pivotable connection between the applicator body 704 and the applicator surface member 712. It is contemplated that in another embodiment, the upturned cusp 708 may be configured as a downward turned cusp that engages a corresponding upturned cusp of the applicator surface member 712.

Returning to FIG. 7A, the applicator surface member 712 is configured to receive the handle 702 and applicator body 704 therein. The applicator surface member 712 is sized to accept both the applicator body 704 and portions of an applicator sleeve 718 when the grill oiler 700 is assembled. The applicator surface member 712 has a first end 712a, a second end 712b, a first side 712c, a second side 712d, an inner bottom surface 712e and an exterior bottom surface 712f. A receiving aperture 716 is formed into the first end 712a and is configured to receive the latch end 706a of the latch mechanism 706. It is contemplated that the receiving aperture 716 be configured for close geometric fit with respect to the latch end 706a and may be various cross-sectional shapes. For example, the receiving aperture 716 may be rectangular to substantially match a rectangular latch end 706a. However, in other embodiments, the receiving aperture 706a may be round such that the aperture may receive a round latch end 706a.

The second end 712b of the applicator surface member 712 has a downturned cusp 710 formed thereon and generally spans between the first side 712c to the second side 712d of the applicator surface member 712. However, it is contemplated that the downturned cusp 710 may extend or comprise a length that is proportional to the width of the applicator surface member 712, where the width is defined by the distance between the first and second sides 712c and 712d of the applicator surface member 712. The downturned cusp 710 of the applicator surface member 712 pivotally and releasbly engages and interlocks with the mating upturned 708 of the applicator body 704. Accordingly, the handle 702 and applicator body 704 can pivot with respect to the applicator surface member 712. As illustrated in FIG. 7B, the inter locking cusps 708 and 710 form a pivotable connection between the applicator body 704 and the applicator surface member 712. It is contemplated that in an alternate embodiment, the upturned cusp 708 may be configured as a downward turned cusp that engages a corresponding upturned cusp of the applicator surface member 712.

As illustrated in FIG. 7A, the first and second sides 712c and 712d of the applicator surface member 712 extend above the first and second ends 712a and 712b. The height of the sides 712c and 712d are configured to guide and closely fit the first and second sides 704c and 704d of the applicator body 704 which in turn facilitates assembly of the grill oiler 700.

It is contemplated that the applicator surface member 712 may be fabricated from various materials such as metals, alloys, composites, polymers or combinations thereof. One of ordinary skill in the art would readily appreciate that various manufacturing processes, now known or later developed, may be implemented to produce the applicator surface member 712. For example, suitable manufacturing processes may include machining, sheet-metal bending/forming, injection molding, casting, vacuum forming or combinations thereof.

An applicator sleeve 718 is illustrated in FIG. 7A and generally comprises a cloth or fabric element that is sized and configured to slide over and envelope the applicator surface member 712. The applicator sleeve 718 has a first end 718a, an open second end 718b, a first side surface 718c, an opposing second side surface 718d, a top surface 718e and a bottom surface 718f. A retention tab 720 is integrally formed from the second end 718b and extends from the bottom surface 718f. The retention tab 720 is configured to roll around the downturnd cusp 710 of the applicator surface member 712 so that when the grill oiler 700 is assembled, the second end 718b of the applicator sleeve 718b is securely retained between the upturned cusp 708 and the downturned cusp 710, see FIG. 7B.

It is contemplated that the applicator sleeve 718 may be fabricated from various cloth-type materials such as terry-cloth, cotton, linen, woven screen or other suitable textiles now known or later developed. The material preferably provides adequate absorption characteristics such that the cleaning oil, detergent, solution or solvent may saturate the applicator sleeve 718 and subsequently transfer the solution to the grill surface. The material should be generally heat resistant and durable such that the material can be repeatably used to clean and dress the grill surface without premature wear or tearing. The material should be pliant such that minimal force is required to assemble the grill oiler 700. In one exemplary embodiment, an applicator sleeve 718 fabricated from terry-cloth provides sufficient absorption, heat resistance and durability. One of ordinary skill in the art would readily appreciate that various manufacturing processes, may be implemented to produce the applicator sleeve 718. For example, some suitable manufacturing processes may include sewing, weaving, braiding, knotting, knitting or combinations thereof.

In operation, the grill oiler 700 is assembled by sliding the applicator sleeve 718 over the first end 712a of the applicator surface member 712 and securing the applicator body 704 to the surface member 712. The applicator sleeve 718 is positioned with its second end 718b adjacent to the second end 712b of the applicator surface member 712. The retention tab 720 of the applicator sleeve 718 is draped over the downturned cusp 710 of the applicator surface member 712. The handle 702 and applicator body 704 are positioned in alignment with the applicator surface member 712 such that the second end 704b of the applicator body 704 is inserted between the first and second sides 712c and 712d of the applicator surface member 712 and the upturned cusp 708 interlocks with the downturned cusp 710. The interlocking of the cusps 708 and 710 capture the retention tab 720 there between.

The handle 702 and applicator body 704 are then rotated with respect to the applicator surface member 712 such that the first end 704a of the applicator body 704 is adjacent to the first end 712a of the applicator surface member 712. Upon closing the assembly, the spring-loaded latch mechanism 706 will retract then extend such that the latch end 706a engages the receiving aperture 716 of the applicator surface member 712. Once assembled, the applicator sleeve 718 is securely captured between the applicator body 704 and applicator surface member 712, see FIG. 7B. The user may then apply a cleaning oil, detergent solution or solvent to the bottom surface 718f of the applicator sleeve 718 either directly or by using the oil reservoir previously described. The assembled grill oiler 700 may now be used to clean or dress a grill or cooking surface.

When the grill oiler 700 requires replacement of the applicator sleeve 718, the user disengages the latch mechanism 706 by depressing the release end 706b and opens the assembly by rotating the handle 702 and applicator body 704 away from the applicator surface member 712. The upturned cusp 708 and downturned cusp 710 are disengaged and the applicator sleeve 718 removed from the applicator surface member 712. A new applicator sleeve 718 may then be reinstalled as previously described. The grill oiler 700 can now be put back into operation.

Figure 8A:
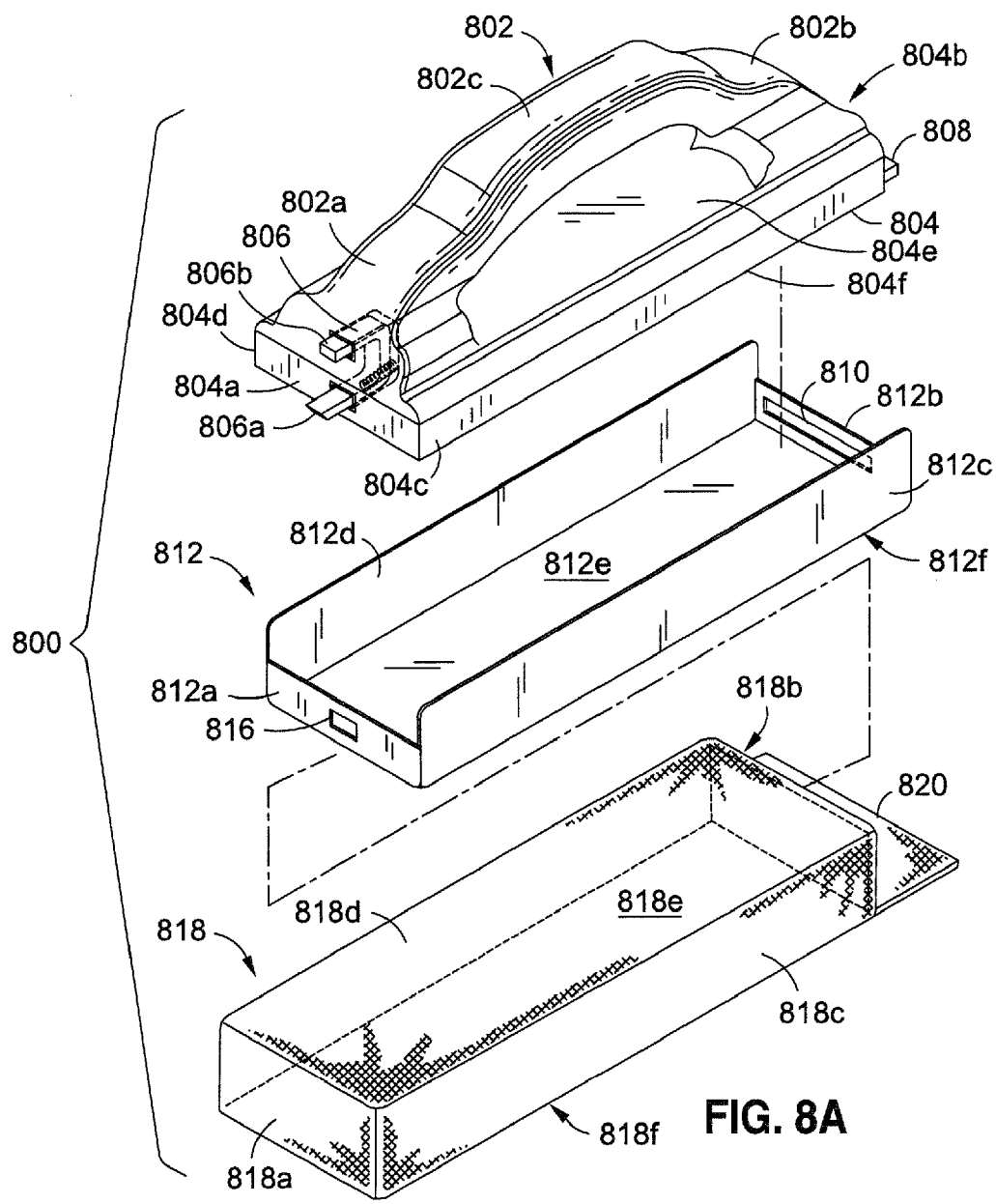
FIG. 8A is an exploded isometric view of an alternate embodiment of the grill oiler in accordance with the present invention.
Figure 8B:
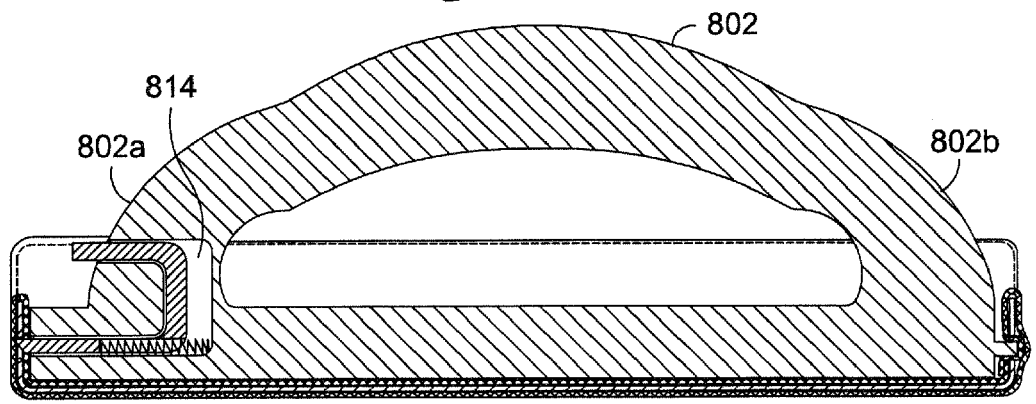
FIG. 8B is a cross-sectional view of the grill oiler assembly of FIG. 8A.

Attention is now directed towards FIGS. 8A and 8B which illustrate another exemplary embodiment for a grill oiler 800. In this embodiment, the grill oiler 800 is generally similar to the grill oiler 700 of FIGS. 7A and 7B with the exception of the rotational pivot means. The grill oiler 800 has a handle 802 that is attached or integrally formed with a top surface of an applicator body 804. The handle 802 has a first end 802a and a second end 802b forming a contoured grasping portion 802c there between. The applicator body 804 has a first end 804a, a second end 804b, a first side 804c, an opposing second side 804d, a top surface 804e, and an opposing bottom surface 804f. The handle 802 is associated with the applicator body such that the first end 802a of the handle 802 is adjacent to the first end 804a of the applicator body 804. Likewise, the second end 802b of the handle 802 is adjacent to the second end 804b of the applicator body. Assembled into and/or onto the first end 804a of the applicator body 804 is a latching mechanism 806. Formed with the second end 804b of the applicator body is a tab 808 which is configured to engage, interlock and mate with a correspondingly slot 810 formed on an applicator surface member 812. The applicator surface member 812 is described in greater detail below.

The handle 802 and applicator body 804 may be fabricated as individual components or alternatively may be fabricated as a unitary construction. It is contemplated that the handle 802 and applicator body 804 may be fabricated from various materials such as metals, alloys, composites, polymers or combinations thereof. One of ordinary skill in the art would readily appreciate that various manufacturing processes, now known or later developed, may be implemented to produce the handle 802 and applicator body 804. For example, suitable manufacturing processes may include machining, injection molding, casting, vacuum forming or combinations thereof.

The first end 804a of the applicator body 804 has a latching mechanism 806 associated therewith. In one embodiment the latching mechanism 806 is contemplated to be a spring-loaded generally U-Shaped member having a latch end 806a and a release end 806b. The latch mechanism 806 is slidably positioned within a retention cavity 814 formed within the handle 802 and applicator body 804 assembly, see FIG. 8B. The latch mechanism 806 is positionable between a first forward position and a second rearward position.

In the first forward position, the latch mechanism 806 is located such that the latch end 806a extends beyond the first end 804a of the applicator body 804. This enables the latch end 806a to operatively engage and extend into a corresponding receiving aperture 816 in the applicator surface member 812. The latch mechanism 806 is biased to a forward position by a spring 806c which is operatively configured to apply a force between the latch mechanism 806 and an inside surface of the retention cavity 814. The release end 806b of the latch mechanism 806 is positioned for convenient activation by a user grasping the handle 802 of the grill oiler 800. The release end 806b extends beyond an outer surface of the first end 802a of the handle 802 such that a user may apply a force to the release end 806b and thereby cause movement of the latch mechanism 806 from the first position to the second position. By depressing the release end 806b of the latch mechanism 806, the mechanism slides in the retention cavity 814 towards the second rearward position. The movement of the latch mechanism 806 in turn causes the latch end 806a to disengage or retract from the receiving aperture 816. Once disengaged, the applicator body 804 and applicator surface member 812 are free to pivot with respect to each other.

The second end 804b of the applicator body 804 has a releasable pivot means provided by a tab 808 that protrudes therefrom and generally spans between the first side 804c to the second side 804d of the applicator body 804. However, it is contemplated that the tab 808 may extend or comprise a length that is proportional to the width of the applicator body 804, where the width is defined by the distance between the first and second sides 804c and 804d of the applicator body 804. The tab 808 of the applicator body 804 pivotally and releasbly engages with a mating slot 810 of the applicator surface member 812. Accordingly, the handle 802 and applicator body 804 can pivot with respect to the applicator surface member 812. As illustrated in FIG. 8B, the tab 808 and slot 810 configuration form a pivotable connection between the applicator body 804 and the applicator surface member 812. It is contemplated that in another embodiment, the tab 808 may be formed on the second end of the applicator surface member 812 and the mating slot 810 may be formed in the second end 804b of the applicator body 804.

Returning to FIG. 8A, the applicator surface member 812 is configured to receive the handle 802 and applicator body 804 therein. The applicator surface member 812 is sized to accept both the applicator body 804 and portions of an applicator sleeve 818 when the grill oiler 800 is assembled. The applicator surface member 812 has a first end 812a, a second end 812b, a first side 812c, a second side 812d, an inner bottom surface 812e and an exterior bottom surface 812f. A receiving aperture 816 is formed into the first end 812a and is configured to receive the latch end 806a of the latch mechanism 806. It is contemplated that the receiving aperture 816 be configured for close geometric fit with respect to the latch end 806a and may be various cross-sectional shapes. For example, the receiving aperture 816 may be rectangular to substantially match a rectangular latch end 806a. However, in other embodiments, the receiving aperture 806a may be round such that the aperture may receive a round latch end 806a.

The second end 812b of the applicator surface member 812 has a slot 810 formed thereon and generally spans between the first side 812c to the second side 812d of the applicator surface member 812. However, it is contemplated that the slot 810 may extend or comprise a length that is proportional to the width of the applicator surface member 812, where the width is defined by the distance between the first and second sides 812c and 812d of the applicator surface member 812. The slot 810 of the applicator surface member 812 pivotally and releasbly engages and interlocks with the mating tab 808 of the applicator body 804. Accordingly, the handle 802 and applicator body 804 can pivot with respect to the applicator surface member 812. As illustrated in FIG. 8B, the tab 808 and slot 810 configuration forms a pivotable connection between the applicator body 804 and the applicator surface member 812. It is contemplated that in an alternate embodiment, the tab and slot configuration may be reversed such that the tab is formed on the second end 812b of the applicator surface member 812 and the slot formed in the second end 804b of the applicator body 804.

As illustrated in FIG. 8A, the first and second sides 812c and 812d of the applicator surface member 812 extend above the first and second ends 812a and 812b. The height of the sides 812c and 812d are configured to guide and closely fit the first and second sides 804c and 804d of the applicator body 804 which in turn facilitates assembly of the grill oiler 800.

It is contemplated that the applicator surface member 812 may be fabricated from various materials such as metals, alloys, composites, polymers or combinations thereof. One of ordinary skill in the art would readily appreciate that various manufacturing processes, now known or later developed, may be implemented to produce the applicator surface member 812. For example, suitable manufacturing processes may include machining, sheet-metal bending/forming, injection molding, casting, vacuum forming or combinations thereof.

An applicator sleeve 818 is illustrated in FIG. 8A and generally comprises a cloth or fabric element that is sized and configured to slide over and envelope the applicator surface member 812. The applicator sleeve 818 has a first end 818a, an open second end 818b, a first side surface 818c, an opposing second side surface 818d, a top surface 818e and a bottom surface 818f. A retention tab 820 is integrally formed from the second end 818b and extends from the bottom surface 818f. The retention tab 820 is configured to drape around the second end 812b of the applicator surface member 812 so that when the grill oiler 800 is assembled, the second end 818b of the applicator sleeve 818b is securely retained between the upturned tab 808 and the slot 810, see FIG. 8B.

It is contemplated that the applicator sleeve 818 may be fabricated from various cloth-type materials such as terrycloth, cotton, linen, woven screen or other suitable textiles now known or later developed. The material preferably provides adequate absorption characteristics such that the cleaning oil, detergent, solution or solvent may saturate the applicator sleeve 818 and subsequently transfer the solution to the grill surface. The material should be generally heat resistant and durable such that the material can be repeatably used to clean and dress the grill surface without premature wear or tearing. The material should be pliant such that minimal force is required to assemble the grill oiler 800. In one exemplary embodiment, an applicator sleeve 818 fabricated from terrycloth provides sufficient absorption, heat resistance and durability. One of ordinary skill in the art would readily appreciate that various manufacturing processes, may be implemented to produce the applicator sleeve 818. For example, some suitable manufacturing processes may include sewing, weaving, braiding, knotting, knitting or combinations thereof.

In operation, the grill oiler 800 is assembled by sliding the applicator sleeve 818 over the first end 812a of the applicator surface member 812 and securing the applicator body 804 to the surface member 812. The applicator sleeve 818 is positioned with its second end 818b adjacent to the second end 812b of the applicator surface member 812. The retention tab 820 of the applicator sleeve 818 is draped over the second end 812b of the applicator surface member 812. The handle 802 and applicator body 804 are positioned in alignment with the applicator surface member 812 such that the second end 804b of the applicator body 804 is inserted between the first and second sides 812c and 812d of the applicator surface member 812 and the tab 808 inserts into the slot 810 and captures the retention tab 820 there between.

The handle 802 and applicator body 804 are then rotated with respect to the applicator surface member 812 such that the first end 804a of the applicator body 804 is adjacent to the first end 812a of the applicator surface member 812. Upon closing the assembly, the spring-loaded latch mechanism 806 will retract then extend such that the latch end 806a engages the receiving aperture 816 of the applicator surface member 812. Once assembled, the applicator sleeve 818 is securely captured between the applicator body 804 and applicator surface member 812, see FIG. 8B. The user may then apply a cleaning oil, detergent solution or solvent to the bottom surface 818f of the applicator sleeve 818 either directly or by using the oil reservoir previously described. The assembled grill oiler 800 may now be used to clean or dress a grill or cooking surface.

When the grill oiler 800 requires replacement of the applicator sleeve 818, the user disengages the latch mechanism 806 by depressing the release end 806b and opens the assembly by rotating the handle 802 and applicator body 804 away from the applicator surface member 812. The tab 808 and slot 810 are disengaged and the applicator sleeve 818 removed from the applicator surface member 812. A new applicator sleeve 818 may then be reinstalled as previously described. The grill oiler 800 can now be put back into operation.

Figure 9A:
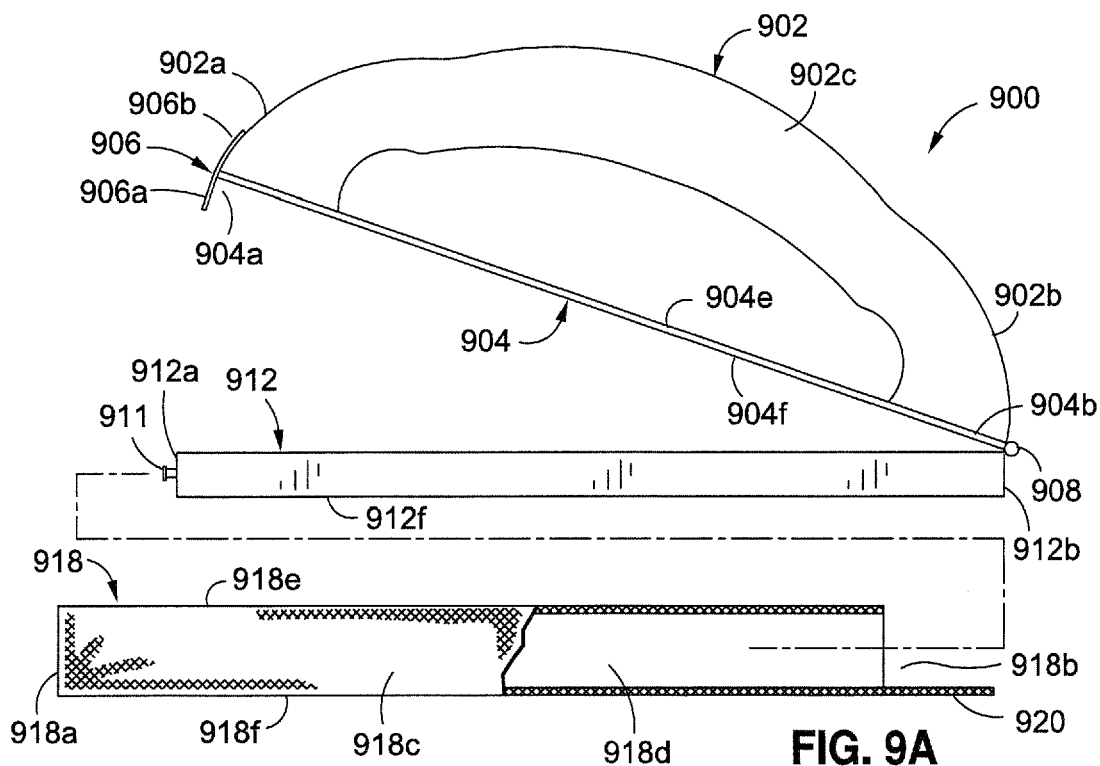
FIG. 9A is an exploded side view of an alternate embodiment of the grill oiler in accordance with the present invention.
Figure 9B:
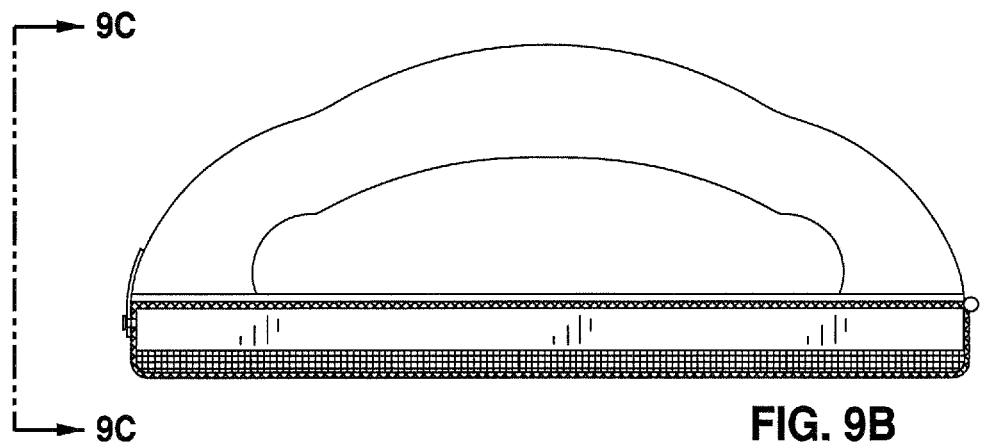
FIG. 9B is a side view of the grill oiler assembly of FIG. 9A.
Figure 9C:
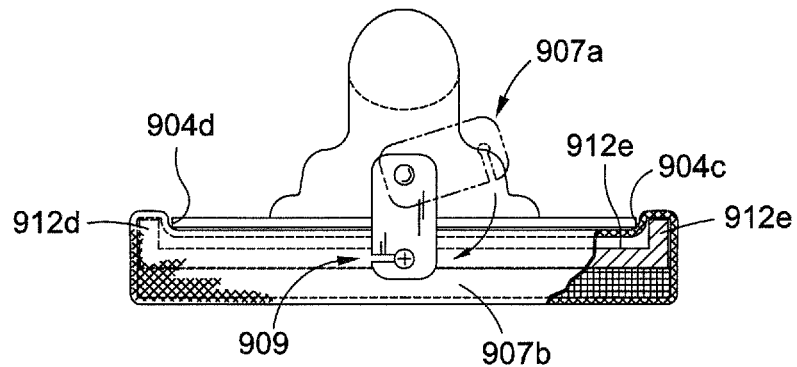
FIG. 9C is a front view of the grill oiler assembly as viewed from reference plain 9C-9C of FIG. 9B.

Attention is now directed towards FIGS. 9A through 9C which illustrate another exemplary embodiment for a grill oiler 900. In this embodiment, the grill oiler 900 is generally similar to the previously described grill oilers with the exceptions of the latching mechanism and rotational pivot means. The grill oiler 900 has a handle 902 that is attached or integrally formed with a top surface of an applicator body 904. The handle 902 has a first end 902a and a second end 902b forming a contoured grasping portion 902c there between. The applicator body 904 has a first end 904a, a second end 904b, a first side 904c, an opposing second side 904d, a top surface 904e, and an opposing bottom surface 904f. The handle 902 is associated with the applicator body such that the first end 902a of the handle 902 is adjacent to the first end 904a of the applicator body 904. Likewise, the second end 902b of the handle 902 is adjacent to the second end 904b of the applicator body. Assembled into and/or onto the first end 904a of the applicator body 904 is a latching mechanism 906. Associated with the second end 904b of the applicator body is a hinge 908 which is operatively connected with an applicator surface member 912. The applicator surface member 912 is described in greater detail below.

The handle 902 and applicator body 904 may be fabricated as individual components or alternatively may be fabricated as a unitary construction. It is contemplated that the handle 902 and applicator body 904 may be fabricated from various materials such as metals, alloys, composites, polymers or combinations thereof. One of ordinary skill in the art would readily appreciate that various manufacturing processes, now known or later developed, may be implemented to produce the handle 902 and applicator body 904. For example, suitable manufacturing processes may include machining, injection molding, casting, vacuum forming or combinations thereof.

The first end 904a of the applicator body 904 has a latching mechanism 906 associated therewith. In one embodiment the latching mechanism 906 is contemplated to be a rotatable slotted member member having a latch end 906a and a pivot end 906b. The latch mechanism 906 is pivotably attached to the handle 902 and applicator body 904 assembly, see FIG. 9C. The latch mechanism 906 is positionable between a first release position 907a and a second locking position 907b.

In the first release position 907a, the latch mechanism 906 is located such that the latch end 906a does not engage the first end 904a of the applicator surface member 912. This enables the applicator body 904 to freely pivot with respect to the applicator surface member 912. In the second locking position 907b, a slot 909 formed in the latch end 906a engages a securing pin 911. The securing pin 911 extends from the first end 912a of the applicator surface member 912. When the latch mechanism 906 is rotated into the second position, it provides a means for securing the grill oiler 900 in a closed position.

The second end 904b of the applicator body 904 has a pivot means provided by a hinge 908 that generally spans between the first side 904c to the second side 904d of the applicator body 904. However, it is contemplated that the hinge 908 may extend or comprise a length that is proportional to the width of the applicator body 904, where the width is defined by the distance between the first and second sides 904c and 904d of the applicator body 904. The hinge 908 provides pivotal functionality between the applicator body 904 and the applicator surface member 912. Accordingly, the handle 902 and applicator body 904 can pivot with respect to the applicator surface member 912. The hinge 908 may be a permanently assembled member or may provide for disassembly of the hinge components.

Returning to FIG. 9A, the applicator surface member 912 is configured to receive the handle 902 and applicator body 904 therein. The applicator surface member 912 is sized to accept both the applicator body 904 and portions of an applicator sleeve 918 when the grill oiler 900 is assembled. The applicator surface member 912 has a first end 912a, a second end 912b, a first side 912c, a second side 912d, an inner bottom surface 912e and an exterior bottom surface 912f. A securing pin 911 extends from he first end 912a and is configured to engage the slot 909 of the latch end 906a. The second end 912b of the applicator surface member 912 is coupled with the hinge 908. Accordingly, the handle 902 and applicator body 904 can pivot with respect to the applicator surface member 912.

As illustrated in FIG. 9C, the first and second sides 912c and 912d of the applicator surface member 912 extend above the first and second ends 912a and 912b. The height of the sides 912c and 912d are configured to guide and closely fit the first and second sides 904c and 904d of the applicator body 904 which in turn facilitates assembly of the grill oiler 900.

It is contemplated that the applicator surface member 912 may be fabricated from various materials such as metals, alloys, composites, polymers or combinations thereof. One of ordinary skill in the art would readily appreciate that various manufacturing processes, now known or later developed, may be implemented to produce the applicator surface member 912. For example, suitable manufacturing processes may include machining, sheet-metal bending/forming, injection molding, casting, vacuum forming or combinations thereof.

An applicator sleeve 918 is illustrated in FIG. 9A and generally comprises a cloth or fabric element that is sized and configured to slide over and envelope the applicator surface member 912. The applicator sleeve 918 has a first end 918a, an open second end 918b, a first side surface 818c, an opposing second side surface 918d, a top surface 918e and a bottom surface 918f. A retention tab 920 is integrally formed from the second end 918b and extends from the bottom surface 918f. The retention tab 920 is configured to drape around the second end 912b of the applicator surface member 912 so that when the grill oiler 900 is assembled, the second end 918b of the applicator sleeve 918b is securely retained with respect to the applicator surface member 912.

It is contemplated that the applicator sleeve 918 may be fabricated from various cloth-type materials such as terrycloth, cotton, linen, woven screen or other suitable textiles now known or later developed. The material preferably provides adequate absorption characteristics such that the cleaning oil, detergent, solution or solvent may saturate the applicator sleeve 918 and subsequently transfer the solution to the grill surface. The material should be generally heat resistant and durable such that the material can be repeatably used to clean and dress the grill surface without premature wear or tearing. The material should be pliant such that minimal force is required to assemble the grill oiler 900. In one exemplary embodiment, an applicator sleeve 918 fabricated from terrycloth provides sufficient absorption, heat resistance and durability. One of ordinary skill in the art would readily appreciate that various manufacturing processes, may be implemented to produce the applicator sleeve 918. For example, some suitable manufacturing processes may include sewing, weaving, braiding, knotting, knitting or combinations thereof.

In operation, the grill oiler 900 is assembled by sliding the applicator sleeve 918 over the first end 912a of the applicator surface member 912 and securing the applicator body 904 to the surface member. The applicator sleeve 918 is positioned with its second end 918b adjacent to the second end 912b of the applicator surface member 912. The retention tab 920 of the applicator sleeve 918 is secured to the second end 912b of the applicator surface member 912 using fastening means such as hook and loop, pins, snaps, buttons, clips, clasps and combinations thereof.

The handle 902 and applicator body 904 are then rotated with respect to the applicator surface member 912 such that the first end 904a of the applicator body 904 is adjacent to the first end 912a of the applicator surface member 912. Upon closing the assembly, the latch mechanism 906 is rotated to the second latching position 907b such that the securing pin 911 operatively engages the latch end 906a of the latching mechanism 906. Once assembled, the applicator sleeve 918 is securely captured between the applicator body 904 and applicator surface member 912, see FIG. 9B. The user may then apply a cleaning oil, detergent solution or solvent to the bottom surface 918f of the applicator sleeve 918 either directly or by using the oil reservoir previously described, The assembled grill oiler 900 may now be used to clean or dress a grill or cooking surface.

When the grill oiler 900 requires replacement of the applicator sleeve 918, the user disengages the latch mechanism 906 by rotating the mechanism to the first release position 907a and opening the assembly by rotating the handle 902 and applicator body 904 away from the applicator surface member 912. A new applicator sleeve 918 may then be reinstalled as previously described. The grill oiler 900 can now be put back into operation.

Figure 10A:
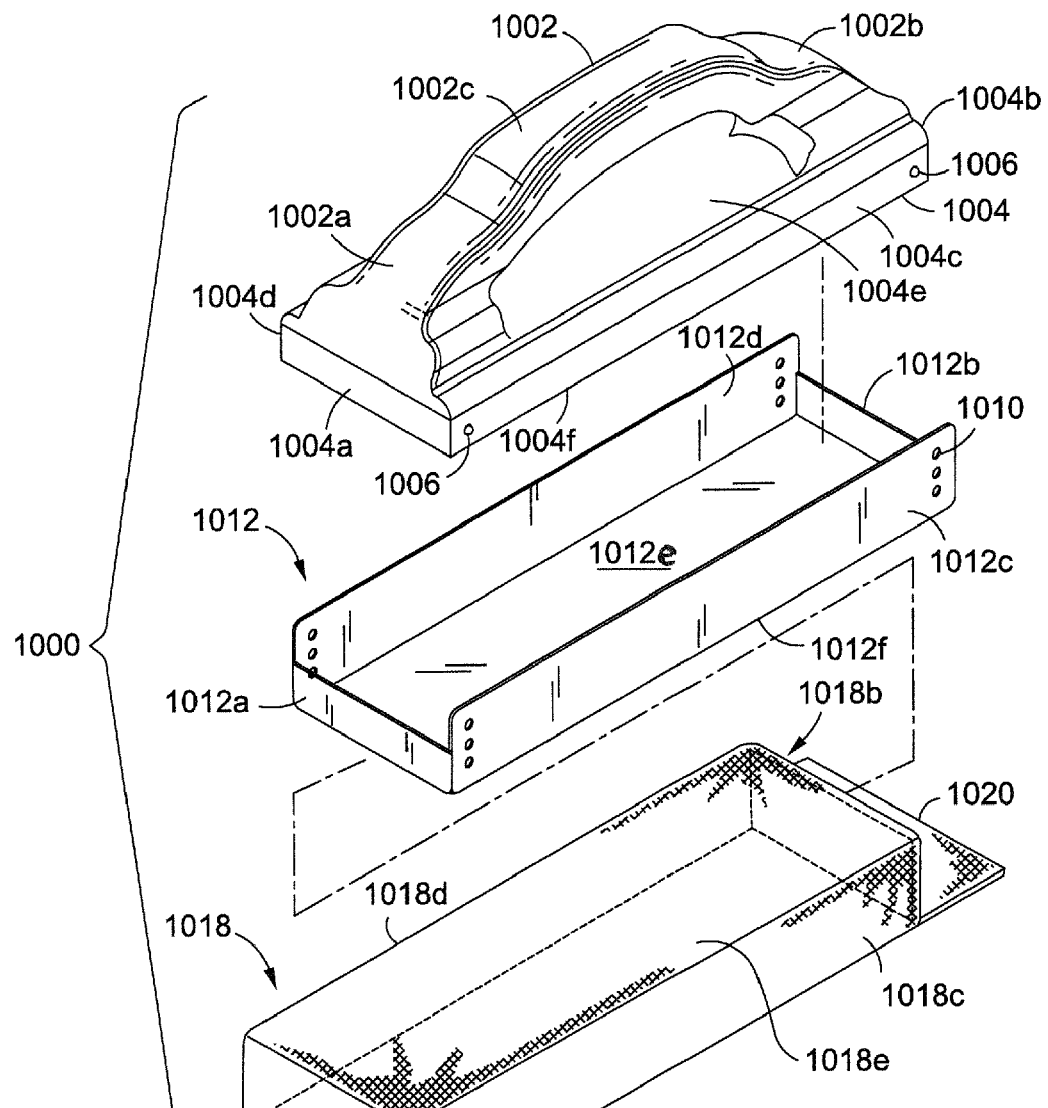
FIG. 10A is an exploded isometric view of an alternate embodiment of the grill oiler in accordance with the present invention.
Figure 10B:
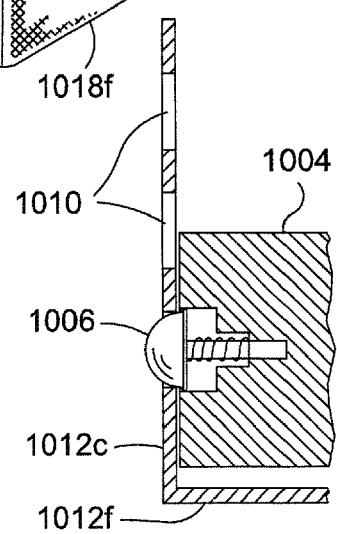
FIG. 10B is a partial cross-sectional view of the grill oiler applicator-locking bullet of the grill oiler assembly of FIG. 10A.

Reference is now made to FIGS. 10A and 10B which illustrate another exemplary embodiment for a grill oiler 1000. In this embodiment, the grill oiler 1000 is generally similar to the grill oilers previously disclosed with exception to the configuration of securing the applicator body to the applicator surface member. The grill oiler 1000 has a handle 1002 that is attached or integrally formed with a top surface of an applicator body 1004. The handle 1002 has a first end 1002a and a second end 1002b forming a contoured grasping portion 1002c there between. The applicator body 1004 has a first end 1004a, a second end 1004b, a first side 1004c, an opposing second side 1004d, a top surface 1004e, and an opposing bottom surface 1004f. The handle 1002 is associated with the applicator body such that the first end 1002a of the handle 1002 is adjacent to the first end 1004a of the applicator body 1004. Likewise, the second end 1002b of the handle 1002 is adjacent to the second end 1004b of the applicator body. Assembled into the first side 1004c and adjacent to the first end 1004a and second end 1004b of the applicator body 1004 is a locking bullet or mechanism 1006. The principles and configurations for locking mechanism 1006 have been described in detail above with reference to FIG. 2. The second side 1004d of the applicator body 1004 is a mirror image of first side 1004c and also has a pair of locking mechanisms 1006 located adjacent to the first and second ends 1004a and 1004b. The locking mechanisms 1006 are configured to engage, interlock and mate with a corresponding aperture 1010 formed on an applicator surface member 1012. The applicator surface member 1012 is described in greater detail below.

The handle 1002 and applicator body 1004 may be fabricated as individual components or alternatively may be fabricated as a unitary construction. It is contemplated that the handle 1002 and applicator body 1004 may be fabricated from various materials such as metals, alloys, composites, polymers or combinations thereof. One of ordinary skill in the art would readily appreciate that various manufacturing processes, now known or later developed, may be implemented to produce the handle 1002 and applicator body 1004. For example, suitable manufacturing processes may include machining, injection molding, casting, vacuum forming or combinations thereof.

The first end 1004a of the applicator body 1004 has a locking mechanism 1006 associated therewith. In one embodiment the locking mechanism 1006 is contemplated to be a spring-loaded locking bullet or mechanism. The locking mechanism 1006 is slidably positioned within a retention cavity formed within the sides of the applicator body 1004 assembly, see FIG. 10B. The locking mechanism 1006 is positionable between an extended position and a retracted position. In the extended position, the locking mechanism 1006 is located such that the end of the bullet extends beyond the sides 1004c and 1004d of the of the applicator body 1004. This enables the locking bullet to operatively engage and extend into a corresponding receiving aperture 1010 in the applicator surface member 1012. The locking mechanism 1006 is biased to the extended position by a spring which is operatively configured to apply a force between the locking mechanism 1006 and an inside surface of the retention cavity.

The applicator body 1004 is sized and configured or insertion into an applicator surface member 1012. Upon insertion of the applicator body 1004, the locking mechanisms 1006, retract and then extend into a corresponding aperture 1010 upon proper alignment there between. Accordingly, the handle 1002 and applicator body 1004 can releaseably engage the applicator surface member 1012 as desired.

Returning to FIG. 10A, the applicator surface member 1012 is configured to receive the handle 1002 and applicator body 1004 therein. The applicator surface member 1012 is sized to accept both the applicator body 1004 and portions of an applicator sleeve 1018 when the grill oiler 1000 is assembled. The applicator surface member 1012 has a first end 1012a, a second end 1012b, a first side 1012c, a second side 1012d, an inner bottom surface 1012e and an exterior bottom surface 1012f. A plurality of receiving apertures 1010 are formed into the first and second sides 1012c and 1012d and adjacent to first and seconded ends 1012a and 1012b. The apertures 1010 are sized and configured to receive the locking mechanisms 1006 of the applicator body 1004 therein. It is contemplated that the receiving apertures 1010 be configured for close geometric fit with respect to the locking mechanisms 1006 and may be various cross-sectional shapes. For example, the receiving aperture 1010 may be circular to substantially match a cylindrical locking mechanism 1006. However, in other embodiments, the receiving aperture 1010 may be rectangular such that the aperture may receive a rectangular locking mechanism 1006.

As illustrated in FIG. 10A, the first and second sides 1012c and 1012d of the applicator surface member 1012 extend above the first and second ends 1012a and 1012b. The height of the sides 1012c and 1012d are configured to guide and closely fit the first and second sides 1004c and 1004d of the applicator body 1004 which in turn facilitates assembly of the grill oiler 1000.

It is contemplated that the applicator surface member 1012 may be fabricated from various materials such as metals, alloys, composites, polymers or combinations thereof. One of ordinary skill in the art would readily appreciate that various manufacturing processes, now known or later developed, may be implemented to produce the applicator surface member 1012. For example, suitable manufacturing processes may include machining, sheet-metal bending/forming, injection molding, casting, vacuum forming or combinations thereof.

An applicator sleeve 1018 is illustrated in FIG. 10A and generally comprises a cloth or fabric element that is sized and configured to slide over and envelope the applicator surface member 1012. The applicator sleeve 1018 has a first end 1018a, an open second end 1018b, a first side surface 1018c, an opposing second side surface 1018d, a top surface 1018e and a bottom surface 1018f. A retention tab 1020 is integrally formed from the second end 1018b and extends from the bottom surface 1018f. The retention tab 1020 is configured to drape around the second end 1012b of the applicator surface member 1012 so that when the grill oiler 1000 is assembled, the second end 1018b of the applicator sleeve 1018b is securely retained between the second end 1004b of the applicator body 1004 and the second end 1012b of the applicator surface member 1012.

It is contemplated that the applicator sleeve 1018 may be fabricated from various cloth-type materials such as terrycloth, cotton, linen, woven screen or other suitable textiles now known or later developed. The material preferably provides adequate absorption characteristics such that the cleaning oil, detergent, solution or solvent may saturate the applicator sleeve 1018 and subsequently transfer the solution to the grill surface. The material should be generally heat resistant and durable such that the material can be repeatably used to clean and dress the grill surface without premature wear or tearing. The material should be pliant such that minimal force is required to assemble the grill oiler 1000. In one exemplary embodiment, an applicator sleeve 1018 fabricated from terrycloth provides sufficient absorption, heat resistance and durability. One of ordinary skill in the art would readily appreciate that various manufacturing processes, may be implemented to produce the applicator sleeve 1018. For example, some suitable manufacturing processes may include sewing, weaving, braiding, knotting, knitting or combinations thereof.

In operation, the grill oiler 1000 is assembled by sliding the applicator sleeve 1018 over the first end 1012a of the applicator surface member 1012 and securing the applicator body 1004 to the surface member 1012 using the locking mechanisms 1006. The applicator sleeve 1018 is positioned with its second end 1018b adjacent to the second end 1012b of the applicator surface member 1012. The retention tab 1020 of the applicator sleeve 1018 is draped over the second end 1012b of the applicator surface member 1012. The handle 1002 and applicator body 1004 are positioned in alignment with the applicator surface member 1012 such that the applicator body 1004 is inserted between the first and second ends 1012a and 1012b as well as between the first and second sides 1012c and 1012d of the applicator surface member 1012.

The handle 1002 and applicator body 1004 are then seated into the interior portion of the applicator surface member 1012 such that the first end 1004a of the applicator body 1004 is adjacent to the first end 1012a of the applicator surface member 1012. Upon closing the assembly, the spring-loaded locking mechanisms 1006 then engage the receiving apertures 1010 of the applicator surface member 1012. Once assembled, the applicator sleeve 1018 is securely captured between the applicator body 1004 and applicator surface member 1012. Referring to FIG. 10B, the user may seat the applicator body 1004 to various depths and engage different receiving apertures 1010 such that adequate tension is applied to the applicator sleeve 1018. The user may then apply a cleaning oil, detergent solution or solvent to the bottom surface 818f of the applicator sleeve 818 either directly or by using the oil reservoir previously described, The assembled grill oiler 1000 may now be used to clean or dress a grill or cooking surface.

When the grill oiler 1000 requires replacement of the applicator sleeve 1018, the user disengages the locking mechanisms 1006 by pulling apart the assembly which causes the locking mechanism to depress and retract and thereby release the applicator body 1004 from the applicator surface member 1012. Once the applicator body 1004 and applicator surface member 1012 are disengaged, the applicator sleeve 1018 can be removed from the applicator surface member 1012. A new applicator sleeve 1018 may then be reinstalled as previously described and the grill oiler 1000 can now be put back into operation.

In another exemplary embodiment, the applicator body may be secured to the applicator surface member by other latching mechanisms. For example, the spring-loaded U-Shaped latch mechanism of FIGS. 7 and 8 may be replaced with the latch mechanism of FIG. 9. Additionally, the latch mechanisms of FIGS. 7 and 8 may be replaced with a magnetic mechanism or a ratchet and pawl locking device.

It is also contemplated that other pivoting means may be implemented between the applicator body and applicator surface member. In one exemplary embodiment, the pivot means may comprise one or more hinge-type configurations. For example, this embodiment may utilize a small tab and slot configuration in each corner of the second end of the body and surface member interface. In another embodiment, the pivot means may comprise a flexible strap or member coupled between the body and surface member.

The invention provides several advantages not found in known grill oilers. For example, the invention enables the use of an applicator sleeve of cloth-like material. The applicator sleeve evenly disperses spreads the cleaning solution on the grill and cooking surface. The present invention also provides an applicator sleeve that can be easily replaced when needed without the use of secondary tools or devices. The invention promotes frequent grill and cooking surface cleaning by making the grill cleaning process easier and less laborious. The invention also reduces the chances of contaminants from entering the food items because the applicator sleeve does not abrade or wear like a steel wool or billow pad. Consequently, the grill oiler of the present invention promotes an increased sanitary environment in which to prepare food items.

Although the above provides a full and complete disclosure of the preferred embodiments of the invention, various modifications, alternate constructions and equivalents will occur to those skilled in the art. For example, although the invention has been described with reference to a handle having two ends, a single ended handle can be utilized as desired. Moreover, different types of materials may be implemented to practice the invention. Additionally, the components may be fabricated using various manufacturing processes. Therefore, the above should not be construed as limiting the invention, which is defined by the claims.

The invention claimed is:

1. A grill oiler for applying oil to a cooking surface, comprising:
   a handle having a first end, a second end and a central grasping portion;
   an applicator body having a first end, a second end, a first side, an opposing second side, a top and a bottom, the handle coupled to the top of the applicator body wherein the first end of the handle is adjacent to the first end of the applicator body and the second end of the handle is adjacent to the second end of the applicator body;
   an applicator surface member having a first end, a second end, a first side, an opposing second side, an inner bottom surface and an exterior bottom surface, the applicator surface member configured to receive a portion of the applicator body therein;
   a pivot means configured to couple the second end of the applicator body with the second end of the applicator surface member;
   a latch mechanism configured to releasably couple the first end of the applicator body with the first end of the applicator surface member; and
   an applicator sleeve coupled with the applicator surface member.

2. The grill oiler in accordance with claim 1, wherein the pivot means comprises a tab and slot configuration.

3. The grill oiler in accordance with claim 1, wherein the pivot means comprises a hinge.

4. The grill oiler in accordance with claim 1, wherein the latch mechanism comprises a spring-loaded latch member coupled with the first end of the applicator body, the latch member configured to engage a receiving aperture formed on the first end of the application surface member.

* * * * *